Feb. 24, 1970  R. CARRUTHERS ET AL  3,497,844

SUPERCONDUCTORS

Filed Aug. 3, 1966  3 Sheets-Sheet 1

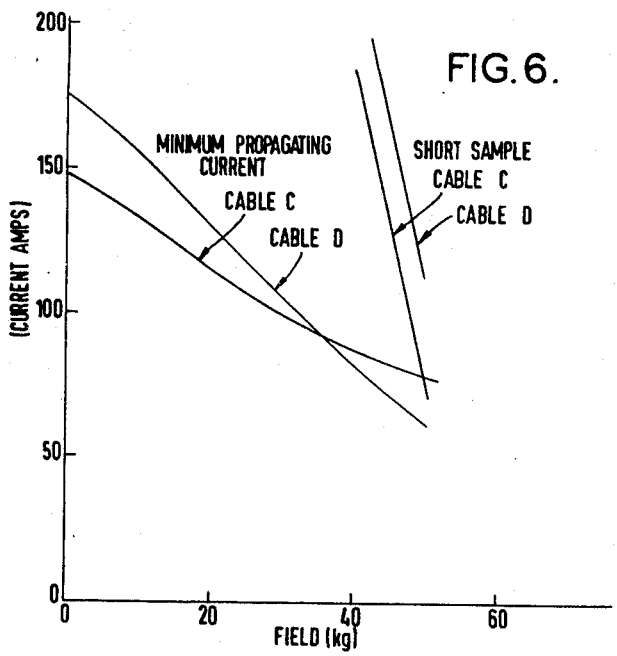
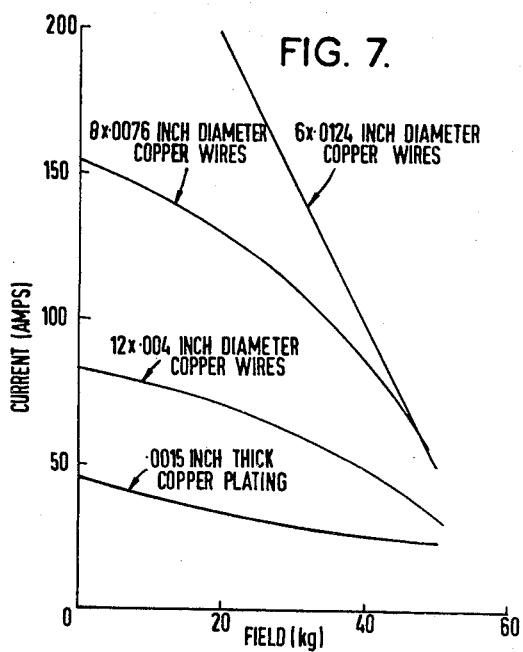

United States Patent Office 3,497,844
Patented Feb. 24, 1970

3,497,844
SUPERCONDUCTORS
Robert Carruthers, Abingdon, and Donald Nelson Cornish, Newbury, England, assignors to United Kingdom Atomic Energy Authority, London, England
Filed Aug. 3, 1966, Ser. No. 569,906
Claims priority, application Great Britain, Aug. 19, 1965, 35,700/65
Int. Cl. H01f 7/22
U.S. Cl. 335—216                                  6 Claims

ABSTRACT OF THE DISCLOSURE

A method for determining the operating characteristics of and for manufacturing a superconducting coil comprising a cable of superconducting material in intimate contact with a normal conductor throughout its length. The characteristic of minimum propagating current against magnetic field strength is determined for each element of the cable over a predetermined range of magnetic field strength. Electrical current vs. magnetic field strength under desired operating conditions are also determined. The coil is then assembled in accordance with these determinations. A superconducting coil produced with its elements located in accordance with the said determinations.

---

Figure 1:
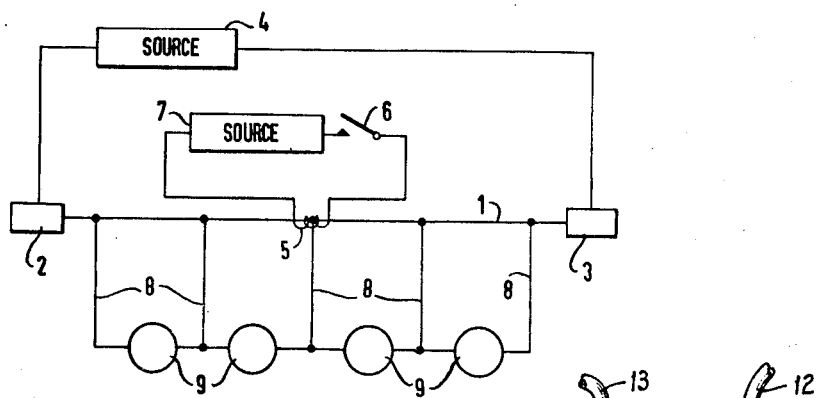

This invention relates to superconductors. The invention is particularly concerned with methods of testing superconducting cables, and with superconducting coils.

Hitherto the performance of superconducting coils, particularly those of large dimensions, has been seriously degraded by unpredictable premature transition of the superconductor to the normal (non-superconducting) state. If the coil comprises a composite superconducting cable formed by a superconductor in intimate contact throughout its length with a normal conductor of high conductivity, this normal conductor will act as a shunt at the point where a transient instability has caused the superconductor to become normal. When the transient has died away the current will either return into the superconductor or remain in the normal conductor. Which of these two courses is taken will depend upon the temperature of the superconductor and its thermal characteristic under the prevailing current and magnetic field conditions.

There has been a previous proposal which purports to provide a method of designing superconducting coils in which a composite superconducting cable is stabilized for operation up to the short sample characteristic of the superconductor. This proposal is, however, somewhat theoretical, and is not directly applicable to the design of an actual coil due to the unknown effects of magnetoresistance, variations in the heat transfer coefficient with temperature, and other factors. Furthermore, operation of the coil up to the short sample characteristic of the superconductor is not necessarily a desirable aim, as it may well result in a coil which is larger or more expensive than it need be for the particular application.

It is therefore an object of the present invention to provide techniques which overcome or avoid these difficulties and disadvantages.

According to one feature of the present invention a method of determining the operating characteristics of a composite superconducting cable formed by a superconductor in intimate contact throughout its length with a normal conductor of high conductivity, comprises passing a current through short length of the cable whilst it is immersed in a cryogenic coolant and subjected to a magnetic field of known magnitude, momentarily heating a small portion of the superconductor sufficiently to cause it to go normal and the current to transfer to the parallel normal conductor, repeating the last step for increasing values of current until a value of current (the minimum propagating current) is reached at which on momentarily heating as aforesaid the normality of the superconducting propagates, and repeating all the steps for other known magnitudes of magnetic field.

This method provides the data required to draw a characteristic curve relating the minimum propagating current to the magnitude of the magnetic field for that superconducting cable.

According to another feature of the present invention there is provided a method for manufacturing a superconducting coil in which the coil is built from a plurality of elements connected in series, each element comprising a wound length of composite superconducting cable formed by a superconductor in intimate contact throughout its length with a normal conductor. The method includes determining for each element a characteristic of minimum of propagating current (as defined below) against magnetic field strength over a predetermined range of magnetic field strength, and also determining the electrical current and magnetic field strength to which each element of the coil is respectively subjected under desired operating conditions. These determinations are employed in selecting the elements and assembling them into a coil.

According to another feature of the invention there is provided a superconducting coil comprising a plurality of elements connected in series, each element comprising a wound length of composite supercondcting cable formed by a superconductor in intimate contact throughout its length with a normal conductor of high conductivity, the minimum propagating current characteristics of the element differing from one element to another, the elements being assembled in predetermined relative locations whereby, when during normal operation the coil is energised, in no element does the electrical current exceed the minimum propagating current corresponding to the magnitude of magnetic field to which that element is subjected.

The design of such a superconducting coil is therefore optimised by testing the available composite superconducting cables in the way set out above whilst the cables have the thermal environment they will have in the coil, plotting their characteristic curves relating minimum propagating current to the magnitude of the magnetic field, determining the magnitude of the magnetic field for the various parts of the coil and selecting the composite superconducting cables appropriate to these various parts of the coil.

For a composite superconducting cable, the minimum propagating current is measured and defined as follows:

An electrical current is passed through a short length of the cable whilst it is immersed in a cryogenic coolant and subjected to a magnetic field of known magnitude. A small portion of the superconducting cable is momentarily heated sufficiently to cause the superconductor to go normal and the current to transfer to the parallel normal conductor, and repeating this last step for increasing values of current until a value of current is reached at which, on momentarily heating as aforesaid, the normality of the superconductor propagates. This value of current is the minimum propagating current for the particular magnitude field to which the short length of cable is subjected.

Figure 2:
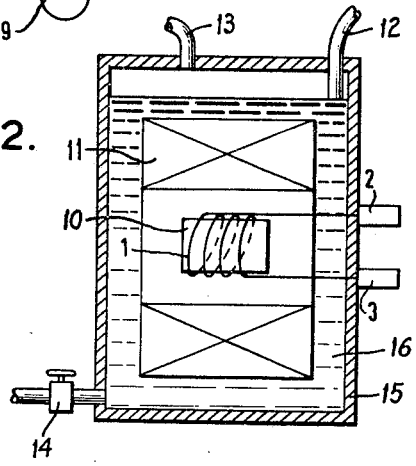

The invention will be better understood by reference to the following exemplary description which refers to the accompanying drawings, in which: FIGURES 1 and 2 illustrate the way in which a short length of composite superconducting cable is tested, and FIGURES 3 to 7 show graphically results that have been obtained from measurements on various composite superconducting cables and on coils wound from such cables.

Firstly the invention is concerned with obtaining a characteristic curve which relates the minimum propagating current of a composite superconducting cable to the magnitude of the magnetic field. The composite superconducting cable is formed by a superconductor in intimate contact throughout its length with a normal conductor of high conductivity. The normal conductor may, for example, be plated on the superconductor, or stranded with the superconductor, or both.

Referring now to FIGURE 1, this shows a short length of composite superconducting cable 1 connected between two terminals 2 and 3 to which is connected a source 4, so that a known current can be passed through the cable 1. Wound around the centre of the cable 1 is a small heater coil 5 which extends over say a 1 cm. length of the cable 1 and is connected by way of a fast switch 6 to a source 7.

Connected to the centre of the cable 1 and at intervals along it are potential taps in the form of fine copper wires 8, between adjacent pairs of which are connected galvanometers 9 for measuring the voltage.

Although shown in FIGURE 1 in extended form, the cable 1 is in fact wound on an insulating tube 10 as indicated in FIGURE 2, to which reference is now also made, and placed within the bore of a superconducting solenoid 11 immersed in liquid helium. The cable 1 is held in place on the tube 10 by thin string at four points on each turn. Diagrammatically represented in FIGURE 2 is a container 15 for liquid helium 16 in which the solenoid 11 is immersed. The container 15 has inlet and outlet passages 12, 13 and means 14 for removing helium liquid.

With this arrangement normality of the superconductor in the cable 1 can be initiated by momentary closure of the switch 6, which causes a current pulse to be applied to the heater coil 5. The extent and duration of the normality are indicated by the voltage measured by the galvanometers 9, and these voltages and the current in the cable 1 are recorded, for example on a multichannel, ultra-violet sensitive recorder, for a range of values of magnetic field whilst the heater coil 5 is pulsed periodically and the current in the cable 1 increased.

At low currents, voltage pulses are detected across the cable 1, indicating that the heater coil 5 is causing normality in its vicinity but that superconductivity is restored after de-energising the heater coil 5. The current in the cable 1 is increased to a value (the minimum propagating current) at which this normality propagates along the entire cable 1.

In cables having a relatively small amount of normal conductor, the total current transfers to the normal conductor at this minimum propagating current. As the amount of normal conductor is increased the transfer becomes only partial and the current can be increased further before transfer is complete. If there is enough normal conductor, the transfer at high magnetic fields becomes completely stepless, occurring at the short sample critical current.

Propagation is impeded by the cooling effects of the wires 8 if the cable 1 has only a small amount of normal conductor. In these cases, therefore, the minimum propagating current is taken as the value at which superconductivity returns as the current is decreased from a value well above the minimum propagating current.

Experiments which have been done to obtain characteristic curves in this way, and to show that these curves may validly be used to predict the performance of the superconducting cables when wound into coils, will now be described.

The first type of superconducting cable on which a complete set of tests was done was a three strand cable (cable A).

Figure 3:
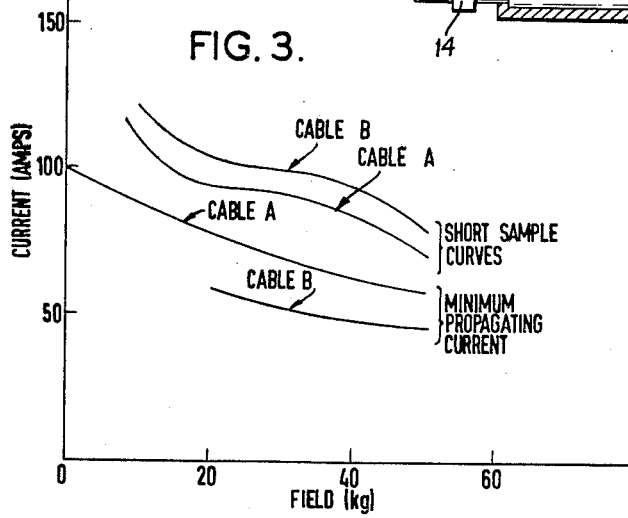

The cable was made by twisting together two 0.010 inch diameter niobium 25% zirconium 75% wires, copper plated to 0.013 inch diameter, together with one 0.0124 inch diameter copper wire, followed by an indium dip. The short sample performance and minimum propagating current for an experimental length of uninsulated cable is shown in FIGURE 3 (cable A).

Figure 4:
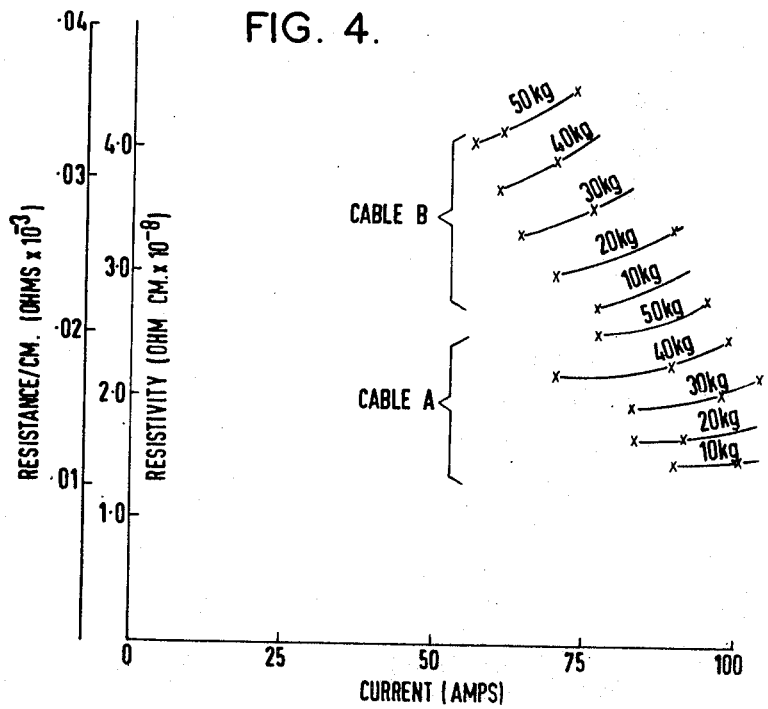

A long length of cable (cable B) was then manufactured. The copper plating in this cable was reduced to 0.001 inch thick and the copper wire was 0.0126 inch diameter. One of the superconducting wires was niobium 25% zirconium 75% and the other niobium 33% zirconium 67%. The results for this cable are also shown on FIGURE 3. It is to be noted that although the short sample characteristic of cable B was better than that of cable A, its minimum propagating current was less. The resistance of the copper in the cables was determined from the potential measurements and is shown in FIGURE 4. The resistivity of the copper in cable B was significantly higher than that of cable A, thus accounting for the lower minimum propagating current. The curves also show the significant contribution of magnetoresistance.

Further tests were then done with cables A and B insulated. Different forms of insulation have different effects on the minimum propagating current. Thus winding the cable with an insulating thread reduces the minimum propagating current and also adds appreciably to the diameter of the cable. An insulating lacquer may therefore be preferable although it must be one which can be applied and cured at a temperature below the melting point of indium, and must be one which will stand temperature cycling down to cryogenic temperatures. At least in some thermal environments an insulating lacquer may increase the minimum propagating current.

Measurements were then made with composite superconducting cable wound into a small coil. Previous tests have shown that a gaseous environment reduces the minimum propagating current of composite superconducting cables by a factor of 2 or 3, thus indicating the importance of ensuring that the cable is in contact with cryogenic liquid, liquid helium in this case. Since the liquid helium will be vapourised by a transient normality it is essential that there must be adequate provision for the removal of the helium gas and its rapid replacement by more liquid helium.

Such transient normality of the superconductor will occur, if at all, when the current in the coil is increasing. When the steady current state has ben reached the cooling becomes much less critical. In fact if the steady current state is to be maintained for an appreciable time economy of coolant can be achieved by withdrawing the liquid helium from the coil and maintaining the cooling with helium gas introduced into the container via inlet 12.

The liquid helium used will normally be liquid helium-I, but in some cases it may be preferable to use liquid helium-II because of its lower temperature (below 2.6° K.), and also because its super-fluid properties give it a higher apparent thermal conductivity which raises the minimum propagating current.

To enable the performance of large coils to be predicted it is necessary to carry out propagation tests on the composite superconducting cable under the appropriate thermal conditions. This was done using a three layer coil with a mesh between layers to allow liquid helium access. The layers were 1¼ inches wide, the width proposed for the final coil, wound on to a ½ inch diameter insulating tube. Adhesive Melinex (registered trademark) tape was wound round the outside of the coil to prevent radial ingress of liquid helium. A heater was wound around the centre turn of the middle layer. The coil was then assembled in the bore of the solenoid and the minimum propagating current found in the same manner as for the short sample in free liquid helium.

Figure 5:
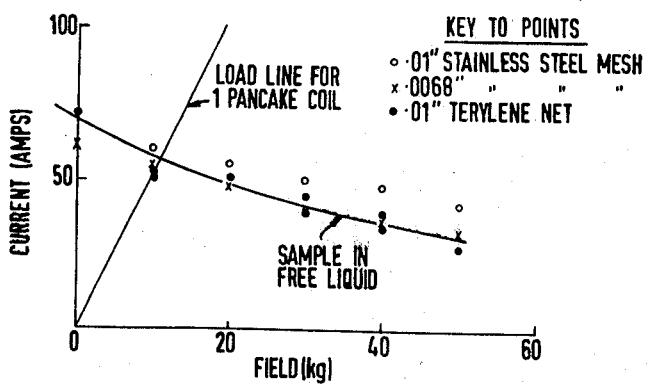

FIGURE 5 shows the performance of a number of such three layer coils all wound with cable B but having different interlayer insulation. The full curve is that obtained for the cable in free liquid. There is fair agreement between the short sample in free liquid helium and the three layer coils. It has not been established whether the deviation from the curve is due to the different interlayer insulation or to constructional variables.

The final coils wound comprised 1596 turns of cable B and had the load line shown in FIGURE 5. The coils were 8 inches bore, 12 inches outside diameter and 1¼ inches wide. Copper mesh ½₂ inch thick was inserted between the coil and the end cheeks to give the liquid helium access to all the layers. The interlayer insulation in the earlier coils was 0.01 inch thick stainless steel mesh, and on the later ones 0.01 inch thick Terylene (registered trademark) net. The coils were wound with cable which had been insulated with Terylene yarn approximately 0.001 inch thick. A heater was incorporated in the inside layer to initiate a normal region for the determination of the minimum propagating current.

In making the measurements the current was raised as the heater was repeatedly pulsed. The first sign of sustained normality occurred at 58 amps when the cable in the vicinity of the heater remained normal after the heater had been de-energised. The current was increased again without further pulsing of the heater. At 64 amps, the region of normality propagated and resistance measurements indicated that it now extended for a distance of approximately four turns. On reducing the current, complete superconductivity was restored at 57 amps. This performance was perfectly repeatable and is seen from FIGURE 5 to be in good agreement with the performance predicted from measurements on the short samples and the small coils.

It has previously been shown that appropriate heat treatment of a superconductor after final drawing can improve the short sample performance of niobium/zirconium superconductors. Unfortunately when heat treated wire is wound into a coil, the degradation is so increased that the coil performance is inferior to that for a similar coil using untreated wire. If, however, a heat treated wire is used in conjunction with a parallel normal conductor, regions subject to a transient change to normality will be neither sustained nor propagated below a certain value of current which is determined solely by the thermal conditions.

The performance of a composite superconducting cable can thus be improved by using heat treated superconductors. To utilise the enhanced short sample performance it is also necessary to increase the copper section and the cooling surface. Accordingly, in one case the number of copper conductors was increased from 1 to 2 and a central 0.005 inch diameter wire was included to obtain a satisfactory mechanical arrangement for stranding. Five strand cables, of only slightly larger diameter than the previous three strand cables were in this way developed. FIGURE 6 shows the performance of two such cables. In cable C the central 0.005 inch wire is a resistance wire, whereas in cable D it is a superconductor. The resistance of the copper in cable D is higher than that in cable C resulting in a falling off in performance at the higher fields.

The effect of increasing the amount of copper surrounding a single heat treated superconducting wire has also been experimentally determined. The basic superconductor was a 0.01 inch diameter niobium 25% zirconium 75% wire, copper plated to 0.013 inch diameter. The minimum propagating currents measured on short lengths of cable freely mounted in liquid helium are shown in FIGURE 7. The table shown below has also been drawn up to obtain a measure of the current density which would be obtainable in a coil at 20 and 40 kg. It has been assumed that there will be 0.1 inch insulation between all layers.

TABLE

| Total number of strands | Diameter of superconductor including plating, inch | Number of copper wires | Diameter of copper wires, inch | Diameter of cable, inch | | Cable currents | | Average current density in winding | |
|---|---|---|---|---|---|---|---|---|---|
| | | | | Bare | Insulated | 20 kg. Amps | 40 kg. Amps | 20 kg. a./cm.$^2 \times 10^4$ | 40 kg. a./cm.$^2 \times 10^4$ |
| 1 | .013 | | | .013 | .015 | 34 | 26 | 1.3 | 1.0 |
| 13 | .013 | 12 | .004 | .021 | .023 | 71 | 50 | 1.4 | 1.0 |
| 9 | .013 | 8 | .0076 | .0282 | .0292 | 130 | 86 | 1.7 | 1.1 |
| 7 | .013 | 6 | .0124 | .0378 | .04 | 200 | 100 | 1.45 | 0.75 |

These results show that if the performance obtained on the samples can be reproduced in coils, a current density in the coil of the order of $1.7 \times 10^4$ amps/cm.$^2$ should be obtainable at 20 kg. with a nine-strand cable. A cheaper arrangement, however, could be obtained by using the seven strand cable at 200 amps per superconducting wire, but the winding would require slightly more space. These figures are based on the minimum propagating current of bare cables, whereas insulated cables will be used in coils. The effect of the temperature drop through the insulation is small, however, and where the insulating is a lacquer the heat transfer may in fact be improved.

The manner in which the current is shared between the superconductor and the normal conductor has been deduced from the voltage and current recordings and the current in the superconductor. This shows that in the case of the cable stranded with 0.004 inch diameter copper wires the current transferred entirely to the copper at fields of 40 kg. and below. This was because the heat generated by current flowing in the copper was always sufficient to maintain the superconductor in a normal state. In the case of the cable stranded with 0.0124 inch diameter copper wires, however, the temperature rise was such as to cause very little reduction in the current carried by the superconductor at least up to 190 amps.

It will be appreciated that tests of the kind described above make it possible to design superconducting coils with a predictable performance. The following criteria can be ascertained from the data obtained:

(a) The design of superconducting cables to give the maximum current density, averaged over the winding space, for a specified magnetic field strength. This is important when the available winding space is limited.

(b) The design of superconducting cables to give the optimum average current density whilst operating at the short sample current. In large diameter coils this normally gives the shortest length of superconductor and therefore probably the cheapest arrangement.

(c) The value of current at which normality could propagate and the conditions under which complete or partial current transfer would take place. Composite superconducting cables having less normal material than would be required to obtain gradual transfer can be used satisfactorily providing the current does not exceed the minimum propagating current.

Thus a superconducting coil can be wound with several different series-connected composite superconducting cables of the kind referred to above. The different cables in different parts of the coil, say in different layers, are chosen so that when the coil is energised the current in no part of any superconducting cable in the coil exceeds the minimum propagating current corresponding to the magnitude of the magnetic field to which that part of the cable is subjected.

The design of such a coil is therefore optimised by testing the available composite superconducting cables in the way described above, plotting their characteristic curves as in FIGURE 7, determining the magnitude of the magnetic field for the various parts of the coil and selecting the composite superconducting cables appropriate to these various parts.

We claim:

1. A method of manufacturing a superconducting coil in which the coil is built from a plurality of elements connected in series, each element comprising a wound length of composite superconducting material formed by a superconductor in intimate contact throughout its length with a normal conductor, the method comprising the following steps: for each element passing a current through a length of the element immersed in a cryogenic coolant and subjected to a magnetic field of known magnitude, momentarily heating a small portion of the superconductor sufficiently to cause it to go normal and the current to transfer to the parallel normal conductor, repeating the last step for increasing values of current until a value of current which is the minimum propagating current is reached, at which on momentarily heating as aforesaid the normality of the superconductor propagates, and repeating the aforementioned steps for other known magnitudes of magentic field, thereby to determine for each of the plurality of elements the characteristic of minimum propagating current against magnetic field strength over a predetermined range of magnetic field strengths, and assembling the elements into the coil, the relative locations of the various elements being chosen in accordance with the aforesaid determination of minimum propagating current characteristics and the electrical current and magnetic field strength to which each element of the coil is respectively subjected under the desired operating conditions of the coil so that, when during operation, the coil is energized, in no element does the electrical current exceed the minimum propagating current corresponding to the magnitude of magnetic fiel dto which that element is subjected.

2. A superconducting coil comprising a plurality of elements connected in series, each element comprising a wound length of composite superconducting material formed by a superconductor in intimate contact throughout its length with a normal conductor of high conductivity, the minimum propagating current characteristics of the elements differing from one element to another, the relative locations of the assembled elements of the coil bearing a direct relationship to the minimum propagating current characteristics of the elements such that during energization of the coil, in no element does the electrical current exceed the minimum propagating current corresponding to the magnitude of magnetic field to which that element is subjected.

3. A superconducting coil is claimed in claim 2 including a container for containing liquid helium coolant and for immersing the coil therein, the container having means for replacing the liquid helium by helium gas at times when the current in the coil is steady.

4. A coil in accordance with claim 2 wherein said normal conductor is plated on said superconductor.

5. A coil in accordance with claim 2 wherein said normal conductor is stranded with said superconductor.

6. A coil in accordance with claim 2 wherein said superconductor is niobium/zirconium.

References Cited

UNITED STATES PATENTS

| | | | |
|---|---|---|---|
| 3,283,277 | 11/1966 | Hulm et al. | 335—216 |
| 3,129,359 | 4/1964 | Kunzler | 335—216 XR |
| 3,187,235 | 6/1965 | Berlincourt et al. | 174—126 XR |
| 3,218,693 | 11/1965 | Allen et al. | 335—216 |
| 3,336,549 | 8/1967 | Kafka et al. | 335—216 |

OTHER REFERENCES

Journal of Applied Physics, vol. 33, No. 12, December 1962, pp. 3499–3504, an article by Riemersma et al.

Journal of Applied Physics, vol. 34, No. 4, April 1963, pp. 1376–77, an article by Stekly et al.

BERNARD A. GILHEANY, Primary Examiner

DEWITT M. MORGAN, Assistant Examiner

U.S. Cl. X.R.

29—599